(12) United States Patent
Chiba

(10) Patent No.: US 6,167,629 B1
(45) Date of Patent: Jan. 2, 2001

(54) ELECTRONIC LEVEL AND A LEVELING ROD FOR USE IN COMBINATION WITH THE SAME

(75) Inventor: Minoru Chiba, Kanagawa-ken (JP)

(73) Assignee: Sokkia Co. Ltd., Tokyo (JP)

( * ) Notice: Under 35 U.S.C. 154(b), the term of this patent shall be extended for 0 days.

(21) Appl. No.: 09/203,495

(22) Filed: Dec. 1, 1998

(30) Foreign Application Priority Data

Dec. 19, 1997 (JP) ................................................ 9-350620

(51) Int. Cl.⁷ ........................... G01C 5/00; G01C 15/02
(52) U.S. Cl. ............................ 33/293; 33/294; 356/375; 356/4.08; 702/154
(58) Field of Search ............................. 33/290, 293, 294, 33/296; 235/494; 356/375, 4.08; 702/94, 95, 154

(56) References Cited

U.S. PATENT DOCUMENTS

| | | | |
|---|---|---|---|
| 940,007 | * 11/1909 | Granbery | 33/293 |
| 952,275 | * 3/1910 | De La Pena | 33/296 |
| 3,110,109 | * 11/1963 | Brittenham | 33/293 |
| 4,715,714 | * 12/1987 | Gaechter et al. | 356/375 |
| 5,539,993 | * 7/1996 | Kilpinen et al. | 33/706 |
| 5,742,378 | * 4/1998 | Kumagai et al. | 33/293 |
| 5,777,899 | 7/1998 | Kumagai | 702/94 |
| 5,887,354 | * 3/1999 | Nagao | 33/293 |

FOREIGN PATENT DOCUMENTS

| | | |
|---|---|---|
| 60-97208 | 5/1985 | (JP) . |
| 5-18042 | 3/1993 | (JP) . |
| 7-4959 | 1/1995 | (JP) . |
| 7-229737 | 8/1995 | (JP) . |
| 9-145358 | 6/1997 | (JP) . |
| 10-38563 | 2/1998 | (JP) . |

* cited by examiner

Primary Examiner—Randy W. Gibson
(74) Attorney, Agent, or Firm—Arent Fox Kintner Plotkin & Kahn, PLLC

(57) ABSTRACT

A leveling rod for an electronic level has a plurality of bar-shaped marks disposed adjacent each other in a longitudinal direction along the leveling rod in parallel with each other and perpendicular to a length of the leveling rod. The marks are arranged at a constant pitch. The width dimensions of the marks in the longitudinal direction of the leveling rod are represented by a plurality of integers. A permutation of predetermined number of values chosen from a sequence of numbers made up of a sequential array of the ratios of the width dimensions is arranged to be different from a permutation chosen from any other portion of the sequence of numbers.

10 Claims, 4 Drawing Sheets

ELECTRONIC LEVEL AND A LEVELING ROD FOR USE IN COMBINATION WITH THE SAME

BACKGROUND OF THE INVENTION

1. Field of the Invention

The present invention relates to an electronic level for automatically determining a collimated position and a leveling rod which is used in combination with the electronic level.

2. Description of the Related Art

As an electronic level of this kind and a leveling rod to be used with the electronic level, there has hitherto been known, for example, in Japanese Published Unexamined Patent Application No. 4959/1995 the following. Namely, the leveling rod has thereon a first pattern in which marks having the same width are arranged at a first pitch and a second pattern in which marks are arranged at a second pitch which is different from the first pitch. The leveling rod is collimated to detect the first and second patterns, and then the detected signals are processed in an analog fashion, whereby the collimated position is obtained.

In the above-described conventional electronic level, the collimated position is obtained on the basis of analog processing of the first and second patterns arranged on the leveling rod. Therefore, it is likely to be subject to disturbances. For example, background or any obstacle between the leveling rod and the electronic level will disable the measurement.

Japanese Patent Application No. 194321/1996 discloses a leveling rod for an electronic level having a plurality of bar marks disposed adjacent each other in a longitudinal direction along the leveling rod and in parallel with each other. The width dimensions of the bar marks in the longitudinal direction of the leveling rod are identical with each other. The ratios of pitches of respectively adjoining bar marks are represented by a plurality of integers. A permutation of values continuously chosen in a predetermined number from a sequence of numbers of the ratios of respective pitches is made to be different from a permutation chosen from any other position of the sequence of numbers. There is also disclosed therein an electronic level having: a pattern detecting portion (or means) for detecting an array pattern of the bar marks on the leveling rod; a memory portion (or means) for storing therein the sequence of numbers in advance; and a computation portion (or means) for obtaining, based on a detected signal from the pattern detecting portion, with which part of a sequence of numbers in the memory portion a permutation of ratios of pitches of respectively adjoining bar marks coincides. The collimated position is thus obtained from the position of the part of the coincidence. In this prior art, since the array pattern of the marks on the leveling rod is digitally processed, it is less sensitive to disturbances than that of analog-processing type disclosed in the above-described Japanese Published Unexamined Patent Application No. 4959/1995.

In the art disclosed in the above-described Japanese Patent Application No. 194321/1996, however, there is a possibility that an obstacle lies between the leveling rod and the electronic level. In case one mark is thus hidden behind the obstacle, it is impossible to read both the upper pitch and the lower pitch of the marks which lie on the upper side and the lower side, respectively, of the hidden mark. It is therefore impossible to obtain a permutation made up of that number of integers which is required to obtain the collimated position from the image within the collimated range.

On the other hand, if the kind of integers forming the sequence of numbers is increased, it is possible to reduce the number of figures required to determine the collimated position, i.e. the predetermined number of integers to be extracted or chosen to form a permutation. This means that the number of marks which are present within the collimated scope may be smaller in number. Accordingly, measurement can still be carried out even if the distance between the leveling rod and the electronic level becomes smaller with a consequent smaller or narrower collimated scope. When the kind of integer is increased, on the other hand, the discrimination of marks becomes difficult. Also a mistake tends to be caused under the influence of disturbance when the distance between the leveling rod and the electronic level is large. Therefore, it is impossible to increase the distance between the leveling rod and the electronic level to a large extent.

Reduction in the kind of integers is advantageous for a large distance between the leveling rod and the electronic level. However it is required to increase the above-described predetermined number which is necessary to determine the collimated position. It is therefore impossible to largely reduce the distance between the leveling rod and the electronic level.

SUMMARY OF THE INVENTION

It is therefore an object of the present invention to resolve the problems mentioned above.

For achieving the object, there is provided according to the present invention a leveling rod for an electronic level having a plurality of bar-shaped marks disposed adjacent each other in a longitudinal direction along the leveling rod in parallel with each other and perpendicular to a length of the leveling rod, characterized in: that the marks are arranged at a constant pitch; that width dimensions of the marks in the longitudinal direction of the leveling rod are represented by a plurality of integers; and that a permutation of predetermined number of values chosen from a sequence of numbers made up of a sequential array of the ratios of the width dimensions is different from a permutation chosen from any other portion of the sequence of numbers.

In the prior art in which the pitch of marks is changed, it is impossible as mentioned above to discriminate two pitches if one mark cannot be detected. On the contrary, if the marks are arranged at a constant pitch and the permutation is obtained by changing the width dimensions of the marks, detection of only one width dimension is sacrificed should one mark be prevented from detection by an interfering obstacle which lies between the leveling rod and the electronic level.

Preferably, the width dimensions of at least two kinds of marks are set to such close values as will enable discrimination thereof when a distance between the electronic level and the leveling rod is shorter than a predetermined distance. A permutation of second predetermined number of values, which is different from said permutation of predetermined number of values, is made different from a permutation chosen from any other portion of the sequence of numbers even when the marks having close values are discriminated or regarded to be of the same dimension. Then, it is possible to reduce the number of marks to be chosen to form the permutation and thus to reduce the distance between the leveling rod and the electronic level since all marks can be clearly discriminated when the distance is small. In case the distance between the leveling rod and the electronic level is large, the distance at which the marks is discriminated can be made large by positively recognizing or regarding the width dimensions of at least two kinds of marks to be the same. If the width dimensions of a plurality of marks are recognized to be of the same dimensions, the kind of integers to represent the width dimensions of the marks is reduced. As a result, the number of marks necessary for determining or locating the collimated position is increased. However, when the distance between the leveling rod and the electronic level is large, the number of marks which fall under the collimated range is large, thereby offering no problem.

When the distance from the ceiling to the collimated position is obtained by suspending the leveling rod from the ceiling surface, it is impossible in the conventional art, in which the collimated position is obtained in an analog processing, to automatically detect that the leveling rod is in the inverted state. It is, therefore, necessary to memorize in the electronic level in advance that the leveling rod is in an inverted state and also to switch a calculating formula for processing analog signals obtained by collimating the marks to another formula exclusively used for the inverted state of the leveling rod.

It is therefore preferable to arrange that a permutation obtained by inverting the order of the sequence of numbers in the above-described permutation is different from a permutation chosen from any other portion of the entire leveling rod. In this arrangement, the order of integers in the permutation obtained in the inverted state of the leveling rod is opposite to that in the erected state of the leveling rod. From the fact that the permutation having such order does not exist, it is possible to automatically find out that the leveling rod has been set in the inverted state.

The electronic level used in combination with the leveling rod preferably comprises a pattern detection portion for detecting an array pattern of the leveling rod; a memory portion for storing therein the sequence of numbers in advance; and a computation portion for obtaining, based on a detected signal from the pattern detecting portion, with which part of a sequence of numbers in the memory portion a permutation of ratios of the width dimension of each mark coincides.

Especially in the electronic level used for collimating the leveling rod in which a permutation obtained by inverting the order of sequence of numbers is different from a permutation chosen from any other portion of the sequence of numbers, either the permutation made by the ratios of width dimensions of the marks or its inverted permutation coincides with any part of the sequence in the memory portion irrespective of whether the leveling rod is in the erected state or in the inverted state.

In other words, the permutation corresponds to any part of the sequence in the memory portion if the leveling rod is in the erected state and the inverted permutation corresponds to any part of the sequence in the memory portion if the leveling rod is in the inverted state. When the inverted permutation corresponds to any part of the sequence in the memory portion, it is possible to judge that the leveling rod is in the inverted state.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
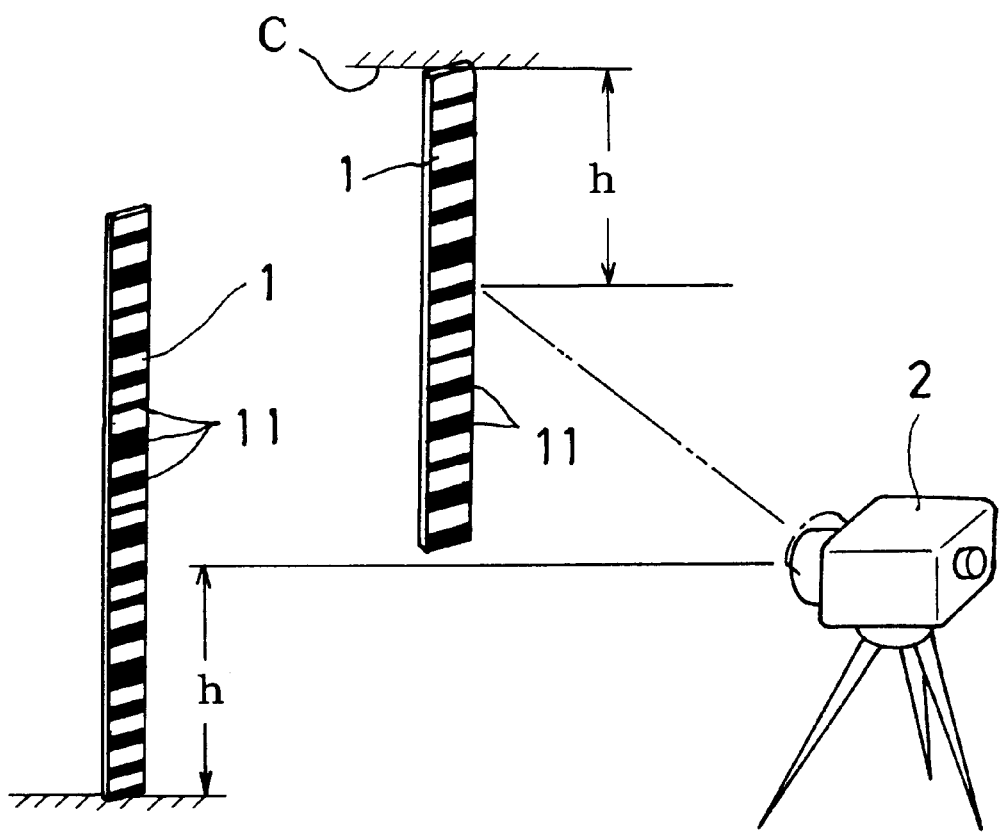
FIG. 1 is a schematic view showing an arrangement of a leveling rod and an electronic level.

With reference to FIG. 1, reference numeral 1 denotes a leveling rod. This leveling rod 1 is collimated by an electronic level 2 in order to measure the height "h" of the collimated position and has black marks 11 arranged at a constant pitch on a white surface. The leveling rod 1 is usually set on a floor or ground in its erected state (i.e., in an ordinary posture). It is also sometimes set on a ceiling "C" in an inverted condition (i.e., upside down) as illustrated. In this case, the distance "h" from the ceiling "C" to the collimated position is measured. This distance is hereinafter also referred to as the height "h" of the collimated position in the same manner as in the case of the erected state. Though not illustrated, numerals are printed on the back of the leveling rod 1 so that an operator can use the leveling rod 1 also in case the collimation is made visually with his own eyes. Accordingly there is no fear of mistaking the top for down of the leveling rod 1. As hereinafter described in more detail, the width dimensions of the marks 11 taken in the vertical direction (i.e., in the longitudinal direction of the leveling rod) are not equal to each other, but several kinds of widths are arranged in a predetermined order.

Figure 2:
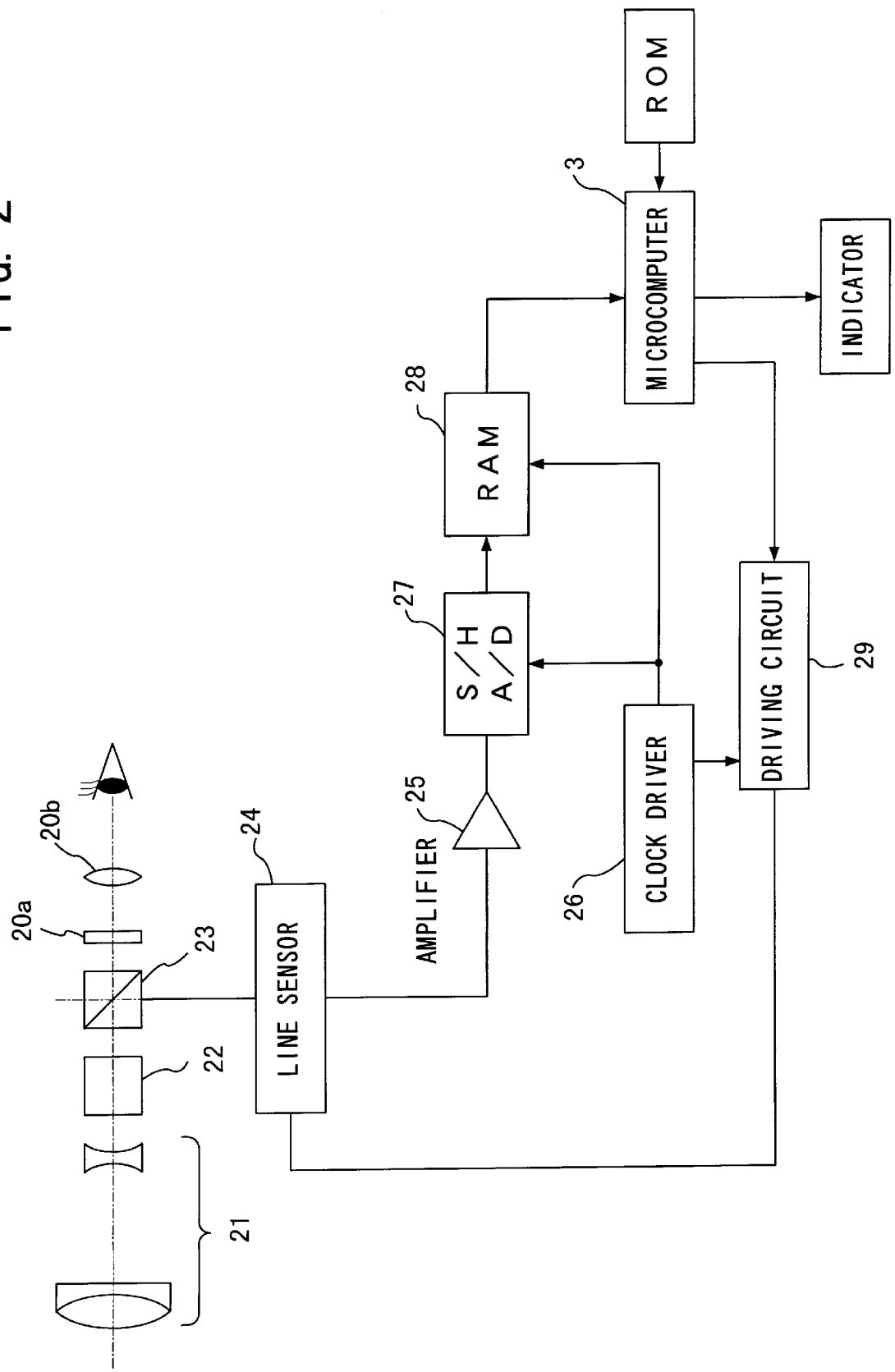
FIG. 2 is a block diagram showing a basic structure of the electronic level.

With reference to FIG. 2, the electronic level 2 is provided therein with an optical system 21 and an automatic tilt compensation mechanism (compensator) 22. An optically received image of the leveling rod 1 is split by a beam splitter 23 into a line sensor 24. The image to pass through the beam splitter 23 constitutes a collimation optical system, and the image split into the line sensor 24 constitutes an image optical system. The collimation optical system comprises the above-described optical system 21, the compensator 22, the beam splitter 23, a reticle 20a, and an eyepiece 20b. The image optical system comprises the optical system 21, the compensator 22, the beam splitter 23, and the line sensor 24. The line sensor 24 converts the optically received image of the leveling rod 1 into an electric signal and outputs it to an amplifier 25. The signal amplified by the amplifier 25 is sent to a sampling and holding means (S/H) 27 in a manner synchronized with a clock signal of a clock driver 26. The signal held in the sampling and holding means is converted to a digital signal by an A/D (analog/digital) converter of a sampling holding circuit 27. The signal converted to the digital signal is stored in a random access memory (RAM) 28. A microcomputer 3 determines the width dimension of each mark 11 on the basis of the signal stored in the RAM 28. The microcomputer 3 also determines the height "h" of the collimated position from the width dimension of the mark 11 and a table value stored in advance in a read-only memory (ROM) 31. A driving circuit 29 is a circuit for controlling the operation of the line sensor 24. Since the optical axis of the collimation optical system and the optical axis of the image optical system are arranged to coincide with each other, the collimated position on the leveling rod 1 and the collimated position in the image optical system coincide with each other.

Figure 3:
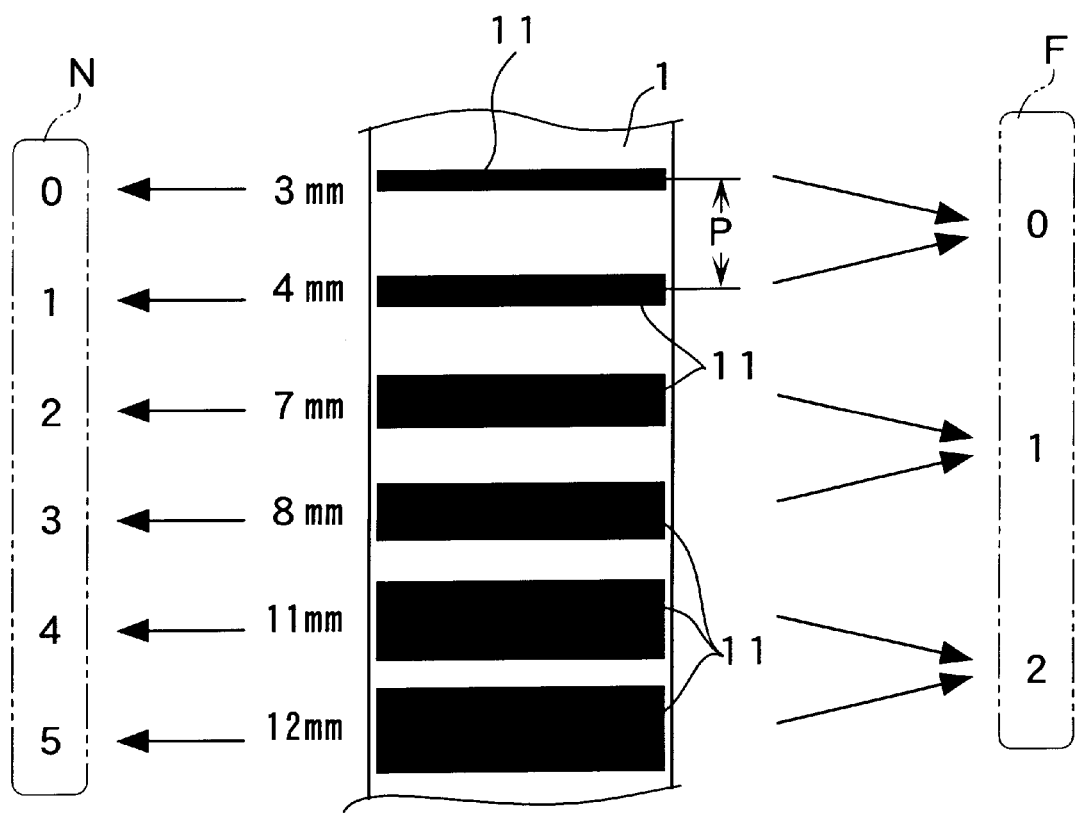
FIG. 3 is an explanatory view showing one example of mark arrangement on the surface of the leveling rod.

As shown in FIG. 3, the marks 11 on the leveling rod 1 are arranged at a constant pitch "P." If the leveling rod 1 has a total length of 4 m and the pitch of the marks 11 is 16 mm, the leveling rod 1 can contain thereon 249 marks 11. In a preferred embodiment of the present invention, six kinds of marks 11 each having a width dimension of 3 mm, 4 mm, 7 mm, 8 mm, 11 mm, and 12 mm are used. The microcomputer 3 obtains the width dimensions of the marks 11 as explained above. According to the present embodiment, instead of using the real width dimensions as they are, six kinds of integers of 0, 1, 2, 3, 4, 5 as shown in the column of "N" in FIG. 3 are made to correspond to the real width dimensions. Accordingly, one example of a sequence of numbers of the marks 11 using six kinds of integers is represented as follows:

$$\ldots 0, 5, 1, 2, 4, 0, 5, 3, 1, 0, 4, 3, 2, 1, 3, 2 \ldots \quad (1)$$

This sequence of numbers should be arranged such that, when making one permutation by choosing or extracting any number of integers from the sequence of numbers (1), one permutation made by extracting the integers from one portion of the sequence of numbers (1) is different from another permutation made by extracting the integers from any other portion of the sequence of numbers. In addition, a permutation obtained in the vertically inverted condition of the leveling rod 1 should be different from any permutation obtained in the erected state of the leveling rod 1. Accordingly, the number of the integers extracted from the sequence of numbers (1) is determined to be five in the preferred embodiment of the present invention. Thus, one example of permutation extracted from the left end portion of the sequence of numbers (1) is represented as follows:

$$[0, 5, 1, 2, 4] \quad (2)$$

However, in picking up five integers, they need not always be continuous. For example, if a mark 11 corresponding to the third integer from the left end of the sequence of numbers (1) is hidden by an obstacle between the leveling rod 1 and the electronic level 2, the permutation to be obtained may be as follows:

$$[0, 5, *, 2, 4, 0] \quad (3)$$

where "*" is an unknown integer hidden by the obstacle.

The same sequence of numbers as in the above-described sequence of numbers (1) is stored in the ROM 31 as a table value. A determination is made with which portion of the permutation (2) or permutation (3) the table value coincides. The height "h" of the collimated position is then obtained from the portion of coincidence.

In case the leveling rod 1 is in an inverted state, the permutation (4) as given below can be obtained by collimating the position in which the permutation (2) was obtained.

$$[4, 2, 1, 5, 0] \quad (4)$$

As described hereinabove, since the permutation (4) is set such that it does not coincide with any part of the sequence of numbers (1), the microcomputer 3, upon obtaining the permutation (4), will judge that the leveling rod 1 is in the inverted state and indicate to that effect. Furthermore, the microcomputer 3 will invert the order of the permutation (4) and will convert the order of the permutation (4) to an inverted permutation which is the same as the permutation (2) to thereby compare the inverted permutation with the sequence of numbers (1).

If the distance between the leveling rod 1 and the electronic level 2 becomes large, the number of the marks 11 positioned within the collimated range increases, but the image of each mark 11 becomes small. As a result, the accuracy of discrimination is reduced. In order to deal with this problem, according to the present invention, the following arrangement is made. Namely, when the distance between the leveling rod 1 and the electronic level 2 has exceeded a predetermined value (for example, 9 m), based on the size of the image of the leveling rod 1, two kinds of width dimensions of the marks 11 are treated or regarded to be of the same dimension. For example, as shown in "F" of FIG. 3, 3 mm and 4 mm are discriminated or recognized to be of the same dimension to thereby make them correspond to 0; 7 mm and 8 mm are discriminated to be of the same dimension to thereby make them correspond to 1; and 11 mm and 12 mm are discriminated to be of the same dimension to thereby make them correspond to 2. In this manner, the above-described sequence of numbers (1) represented by six kinds of integers can be represented by three kinds of integers as follows:

$$\ldots 0, 2, 0, 1, 2, 0, 2, 1, 0, 0, 2, 1, 1, 0, 1, 1 \ldots \quad (5)$$

The sequence of numbers (5) is also stored in the ROM 31 in addition to the sequence of numbers (1). Since the kind of integers forming the sequence of numbers (5) is reduced to three, it is necessary to increase the number of integers to be extracted in forming the permutation. According to the preferred embodiment of the present invention, eight integers are extracted to form the permutation and thus the following permutation formed by extracting eight integers from the left end of the sequence of numbers (5) can be obtained:

$$[0, 2, 0, 1, 2, 0, 2, 1] \quad (6)$$

In addition, when some (for example, two) of marks 11 cannot be discriminated because they are hidden behind an obstacle, it is possible to form a permutation (7) by extracting discontinuous eight integers as follows:

$$[0, 2, 0, *, 2, 0, *, 1, 0, 0] \quad (7)$$

Thus the height "h" of the collimated position is determined by finding with which portion of the sequence of numbers (5) stored in the ROM 31 the permutation (6) or permutation (7) coincides. When the leveling rod 1 is used in the inverted state, the permutation obtained as above is inverted to the inverted permutation and the height "h" of the collimated position can be determined by the inverted permutation and the sequence of numbers (5).

Figure 4:
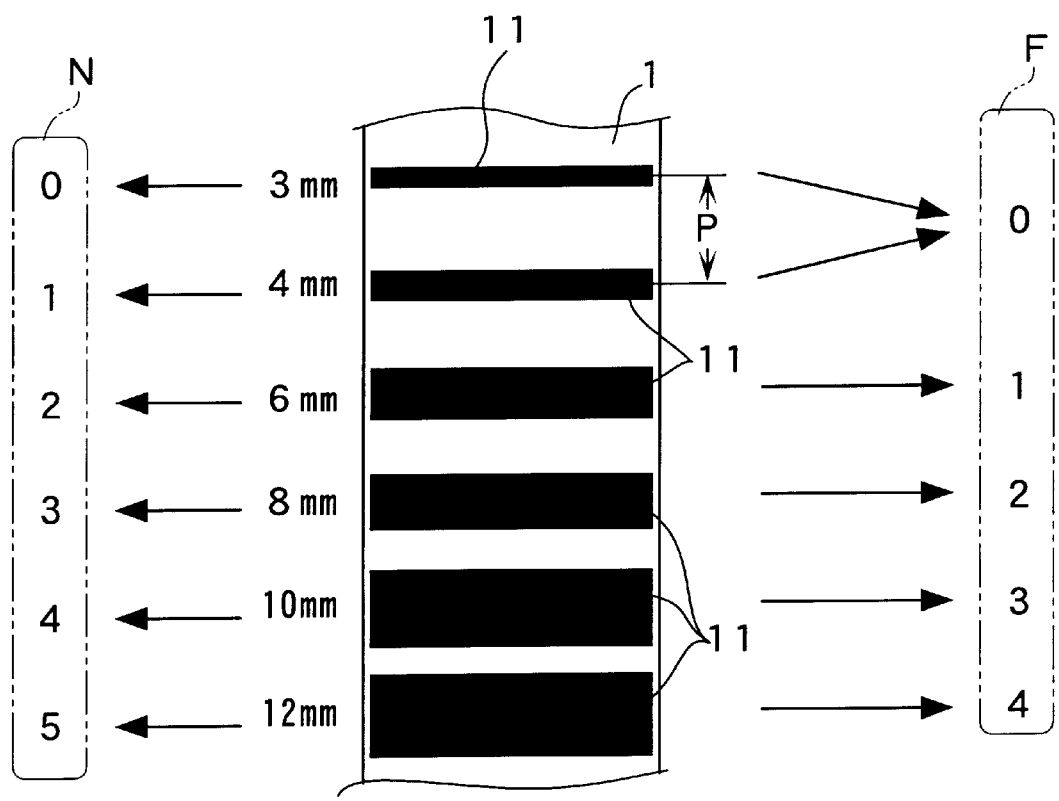
FIG. 4 is an explanatory view showing another example of mark arrangement on the surface of the leveling rod.

In the embodiment of FIG. 3, the sequence of numbers (1) is formed by six kinds of integers 0–5 when the distance between the leveling rod 1 and the electronic level 2 is short. On the other hand, the sequence of numbers (5) is formed by three kinds of integers 0–2 when the above-described distance is long. However, it is possible, as shown in FIG. 4, to use a leveling rod 1 having six kinds of width dimensions of marks 11 such as 3 mm, 4 mm, 6 mm, 8 mm, 10 mm, and 12 mm. When the above-described distance is large, 3 mm and 4 mm are discriminated to be of the same dimension, whereby the sequence of numbers is made by five kinds of integers 0–4.

Still furthermore, it is also possible to use six kinds of width dimensions of marks 11 such as 3 mm, 4 mm, 5 mm, 8 mm, 10 mm, and 12 mm. When the above-described distance is large, 3 mm, 4 mm, and 5 mm are discriminated to be of the same dimension to thereby make them correspond to 0, whereby the sequence of numbers is made by four kinds of integers 0–3.

As explained hereinabove, in the leveling rod and the electronic level of the present invention, the height of collimating position is obtained on the basis of a permutation of integers based on the width dimensions of the marks. Therefore, it is not subject to disturbances. In addition, since the kinds of integers forming the permutation is increased or decreased depending on the distance between the leveling rod and the electronic level, it is possible to expand the range of measurable distance between the leveling rod and the electronic level.

It is readily apparent that the above-described electronic level and leveling rod to be used therewith meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A leveling rod for an electronic level having a plurality of bar-shaped marks disposed adjacent each other in a longitudinal direction along the leveling rod in parallel with each other and perpendicular to a length of the leveling rod, characterized in:
    that the marks are arranged at a constant pitch;
    that width dimensions of the marks in the longitudinal direction of the leveling rod are represented by a plurality of integers; and
    that a permutation of predetermined number of values chosen from a sequence of numbers made up of a sequential array of the ratios of the width dimensions is different from a permutation chosen from any other portion of the sequence of numbers.

2. A leveling rod according to claim 1, wherein the width dimensions of at least two kinds of marks are set to such close values as will enable discrimination thereof when a distance between the electronic level and the leveling rod is shorter than a predetermined distance, and wherein a permutation of second predetermined number of values, which is different from said permutation of predetermined number of values, is different from a permutation chosen from any other portion of the sequence of numbers even when the marks having close values are discriminated to be of the same dimension.

3. A leveling rod according to claim 1, wherein a permutation obtained by inverting the order of the sequence of numbers in said permutation of predetermined number of values is different from a permutation chosen from any other portion of the entire leveling rod.

4. A leveling rod according to claim 2, wherein a permutation obtained by inverting the order of the sequence of numbers in the above-described permutation is different from a permutation chosen from any other portion of the entire leveling rod.

5. An electronic level used in combination with a leveling rod of claim 1, comprising:
    a pattern detection portion for detecting an array pattern of the leveling rod;
    a memory portion for storing therein the sequence of numbers in advance; and
    a computation portion for obtaining, based on a detected signal from the pattern detecting portion, with which part of a sequence of numbers in the memory portion a permutation of ratios of the width dimension of each mark coincides.

6. An electronic level used in combination with a leveling rod of claim 2, comprising:
    a pattern detection portion for detecting an array pattern of the leveling rod;
    a memory portion for storing therein the sequence of numbers in advance; and
    a computation portion for obtaining, based on a detected signal from the pattern detecting portion, with which part of a sequence of numbers in the memory portion a permutation of ratios of the width dimension of each mark coincides.

7. An electronic level used in combination with a leveling rod of claim 3, comprising:
    a pattern detection portion for detecting an array pattern of the leveling rod;
    a memory portion for storing therein the sequence of numbers in advance; and
    a computation portion for obtaining, based on a detected signal from the pattern detecting portion, with which part of a sequence of numbers in the memory portion a permutation of ratios of the width dimension of each mark coincides.

8. An electronic level used in combination with a leveling rod of claim 4, comprising:
    a pattern detection portion for detecting an array pattern of the leveling rod;
    a memory portion for storing therein the sequence of numbers in advance; and
    a computation portion for obtaining, based on a detected signal from the pattern detecting portion, with which part of a sequence of numbers in the memory portion a permutation of ratios of the width dimension of each mark coincides.

9. An electronic level used in combination with a leveling rod of claim 3, comprising:
    a pattern detection portion for detecting an array pattern of the leveling rod;
    a memory portion for storing therein the sequence of numbers in advance;
    a computation portion for obtaining, based on a detected signal from the pattern detecting portion, with which part of a sequence of numbers in the memory portion a permutation of ratios of the width dimension of each mark coincides; and
    a second computation portion for obtaining with which part of a sequence of numbers of the memory portion coincides one of said permutation of ratios of the width dimension of each mark and an inverted permutation obtained by inverting the direction of said permutation.

10. An electronic level used in combination with a leveling rod of claim 4, comprising:
    a pattern detection portion for detecting an array pattern of the leveling rod;
    a memory portion for storing therein the sequence of numbers in advance;
    a computation portion for obtaining, based on a detected signal from the pattern detecting portion, with which part of a sequence of numbers in the memory portion a permutation of ratios of the width dimension of each mark coincides; and
    a second computation portion for obtaining with which part of a sequence of numbers of the memory portion coincides one of said permutation of ratios of the width dimension of each mark and an inverted permutation obtained by inverting the direction of said permutation.

* * * * *